United States Patent
Nakayama

(10) Patent No.: US 10,211,635 B2
(45) Date of Patent: Feb. 19, 2019

(54) POWER CONTROL SYSTEM AND CONTROL METHOD OF POWER CONTROL SYSTEM

(71) Applicant: KYOCERA Corporation, Kyoto-shi, Kyoto (JP)

(72) Inventor: Shusuke Nakayama, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 139 days.

(21) Appl. No.: 15/113,419

(22) PCT Filed: Jan. 22, 2015

(86) PCT No.: PCT/JP2015/000293
§ 371 (c)(1),
(2) Date: Jul. 21, 2016

(87) PCT Pub. No.: WO2015/111410
PCT Pub. Date: Jul. 30, 2015

(65) Prior Publication Data
US 2017/0012428 A1    Jan. 12, 2017

(30) Foreign Application Priority Data

Jan. 22, 2014  (JP) ................................. 2014-009916
Jan. 29, 2014  (JP) ................................. 2014-014939

(51) Int. Cl.
*H02J 7/35*         (2006.01)
*H02J 3/38*         (2006.01)
(Continued)

(52) U.S. Cl.
CPC .............. *H02J 3/382* (2013.01); *H02J 3/381* (2013.01); *H02J 3/383* (2013.01); *H02J 3/387* (2013.01);
(Continued)

(58) Field of Classification Search
CPC .. H02J 3/381; H02J 3/382; H02J 3/383; H02J 3/387; H02J 7/0068; H02J 7/35;
(Continued)

(56) References Cited

U.S. PATENT DOCUMENTS 9,523,991 B2      12/2016  Baba et al.
2012/0257429 A1   10/2012  Dong et al.
(Continued)

FOREIGN PATENT DOCUMENTS

JP    11-262198 A       9/1999
JP    2007-049770 A     2/2007
(Continued)

OTHER PUBLICATIONS

Written Opinion of the International Searching Authority dated Apr. 14, 2015, issued by the Japanese Patent Office for International Application No. PCT/JP2015/000293.
(Continued)

*Primary Examiner* — Hal Kaplan
(74) *Attorney, Agent, or Firm* — Procopio Cory Hargreaves and Savitch LLP

(57) ABSTRACT

To establish a system capable of efficient operation control between a plurality of distributed power sources without undermining the versatility of the distributed power sources, a power control system controls a power generation device and other distributed power sources, the power generation device generating power while a current sensor detects forward power flow. The power control system includes: a power control device including an output unit configured to output power supplied from the other distributed power sources, in a state where the power generation device and the other distributed power sources are paralleled off from a grid; and a dummy output system configured to supply a dummy current detectable by the current sensor as a current
(Continued)

in the same direction as the forward power flow, using an output from the output unit, wherein the dummy output system includes step-down unit located between the output unit and the current sensor.

16 Claims, 14 Drawing Sheets

(51) Int. Cl.
*H02M 7/44* (2006.01)
*H02J 9/06* (2006.01)
*H02J 7/00* (2006.01)

(52) U.S. Cl.
CPC .............. *H02J 7/0068* (2013.01); *H02J 7/35* (2013.01); *H02J 9/062* (2013.01); *H02M 7/44* (2013.01); *Y02B 10/72* (2013.01); *Y02E 10/563* (2013.01); *Y02E 10/566* (2013.01)

(58) Field of Classification Search
CPC ........... H02J 9/062; H02M 7/44; Y02B 10/72; Y02E 10/563; Y02E 10/566
USPC ..................................................... 307/82, 52
See application file for complete search history.

(56) References Cited

U.S. PATENT DOCUMENTS

| | | |
|---|---|---|
| 2012/0259583 A1 | 10/2012 | Noboa et al. |
| 2013/0328397 A1 | 12/2013 | Lee |
| 2014/0052310 A1 | 2/2014 | Baba et al. |

FOREIGN PATENT DOCUMENTS

| | | |
|---|---|---|
| JP | 2008-253033 A | 10/2008 |
| JP | 2013-172477 A | 9/2013 |
| WO | 2012/165153 A1 | 12/2012 |

OTHER PUBLICATIONS

Extended European Search Report dated May 19, 2017, issued by the European Patent Office in counterpart European Patent Application No. 15 74 0623.2.

International Search Report dated Apr. 14, 2015 issued by the Japanese Patent Office for International Application No. PCT/JP2015/000293.

POWER CONTROL SYSTEM AND CONTROL METHOD OF POWER CONTROL SYSTEM

CROSS REFERENCE TO RELATED APPLICATION

This application claims priority to Japanese Patent Application No. 2014-9916 filed on Jan. 22, 2014 and Japanese Patent Application No. 2014-14939 filed on Jan. 29, 2014, the entire disclosures of which are incorporated herein by reference.

TECHNICAL FIELD

The disclosure relates to a power control system and a control method of a power control system.

BACKGROUND

A known power control device for a power generation system including a power generation facility such as a solar panel is capable of grid-connected operation of outputting AC power in connection with a commercial electric power grid (hereafter abbreviated to "grid" as appropriate) and isolated operation of outputting AC power independently of the grid (for example, see Patent Literature (PTL) 1).

A known power control device for a power storage system including a power storage facility such as a storage battery charged with grid power is capable of grid-connected operation of outputting AC power in connection with a grid and isolated operation of outputting AC power independently of the grid (for example, see PTL 2), as with the aforementioned power control device.

CITATION LIST

Patent Literatures

PTL 1: JP 2007-049770 A
PTL 2: JP 2008-253033 A

SUMMARY

Technical Problem

There has been demand for a power control system that collectively manages and operates a plurality of distributed power sources such as a solar cell, a storage battery, a fuel cell, and a gas power generator. In particular, there has been demand to establish a system capable of efficient operation control between a plurality of distributed power sources without undermining the versatility of the distributed power sources.

It could therefore be helpful to provide a power control system capable of efficient operation control between a plurality of distributed power sources without undermining the versatility of the distributed power sources, and a control method of the power control system.

Solution to Problem

A power control system according to the disclosure is a power control system that controls a power generation device and other distributed power sources, the power generation device generating power while a current sensor detects forward power flow, the power control system including: a power control device including an output unit configured to output power supplied from the other distributed power sources, in a state where the power generation device and the other distributed power sources are paralleled off from a grid; and a dummy output system configured to supply a dummy current detectable by the current sensor as a current in the same direction as the forward power flow, using an output from the output unit, wherein the dummy output system includes a step-down unit configured to step down the power supplied from the other distributed power sources located between the output unit and the current sensor.

A control method of a power control system according to the disclosure is a control method of a power control system that is provided in a consumer's facility and performs power control, the consumer's facility including a power generation device and other distributed power sources, the power generation device generating power while a current sensor detects forward power flow, the control method including: outputting power supplied from the other distributed power sources, in a state where the power generation device and the other distributed power sources are paralleled off from a grid; stepping down the power supplied from the other distributed power sources; and supplying a dummy current detectable by the current sensor as a current in the same direction as the forward power flow, using the stepped down power.

Advantageous Effect

It is possible to provide a power control system capable of efficient operation control between a plurality of distributed power sources without undermining the versatility of the distributed power sources, and a control method of the power control system.

DETAILED DESCRIPTION

The following describes disclosed embodiments in detail with reference to drawings.

Embodiment 1

A power control system according to Embodiment 1 is described first. A power control system 100 according to this embodiment includes a distributed power source that supplies sellable power and/or a distributed power source that supplies unsellable power, apart from power supplied from a grid (commercial electric power grid). Examples of the distributed power source that supplies sellable power include a system for supplying power by solar power generation or the like. Examples of the distributed power sources that supplies unsellable power include a storage battery system that can be charged and discharged, a fuel cell system including a fuel cell such as a solid oxide fuel cell (SOFC), and a gas power generation system for generating power using gas fuel. This embodiment describes an example of including a solar cell as a distributed power source that supplies sellable power and a storage battery and a power generation device such as a fuel cell or a gas power generator as distributed power sources that supply unsellable power.

Figure 1:
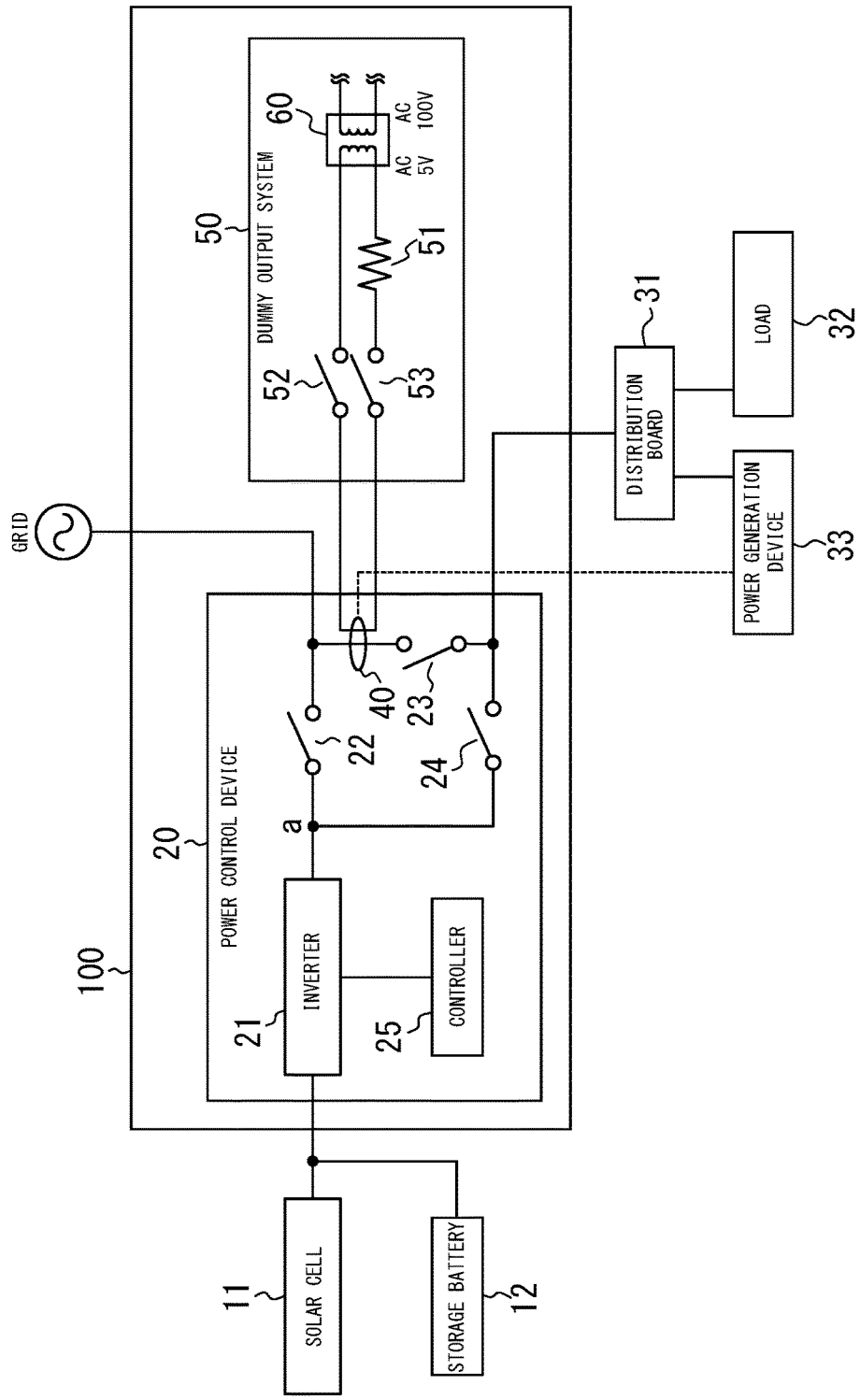
FIG. 1 is a block diagram of a power control system according to Embodiment 1.

FIG. 1 is a block diagram illustrating the schematic structure of the power control system 100 according to Embodiment 1. The power control system 100 according to this embodiment includes a power control device 20 (power control device) and a dummy output system 50. FIG. 1 also illustrates a solar cell 11, a storage battery 12, a distribution board 31, a load 32, and a power generation device 33 that are connected to the power control system 100. The power generation device 33 is a device including a fuel cell or a gas power generator. The power control system 100 normally performs grid-connected operation, to supply power from the grid and power from each distributed power source (the solar cell 11, the storage battery 12, the power generation device 33) to the load 32. In the case where no power is supplied from the grid due to a power failure or the like, the power control system 100 performs isolated operation to supply power from each distributed power source (the solar cell 11, the storage battery 12, the power generation device 33) to each load (the load 32, a dummy current load 51). When the power control system 100 performs isolated operation, each distributed power source (the solar cell 11, the storage battery 12, the power generation device 33) is paralleled off from the grid. When the power control system 100 performs grid-connected operation, each distributed power source (the solar cell 11, the storage battery 12, the power generation device 33) is paralleled to the grid.

In FIG. 1, the solid lines between the functional blocks represent wiring through which power flows, and the dotted lines between the functional blocks represent the flow of control signals or information communicated. The communication represented by the dotted lines may be wired communication or wireless communication. Various schemes are available for the communication of information and control signals, including each layer. For example, the communication may be performed by a short-range communication scheme such as ZigBee® (ZigBee is a registered trademark in Japan, other countries, or both). The communication may also be performed using various transmission media such as infrared communication and power line communication (PLC). Moreover, any of various communication protocols defining the logical layer, such as ZigBee SEP 2.0 (Smart Energy Profile 2.0) and ECHONET Lite® (ECHONET Lite is a registered trademark in Japan, other countries, or both), may be operated on lower layers including the physical layer suitable for each communication.

The solar cell 11 converts energy from sunlight into electric power. For example, the solar cell 11 is formed by connecting power generators having photoelectric conversion cells in a matrix to output a predetermined current (e.g. 10 A). The type of the solar cell 11 is not limited as long as it is capable of photoelectric conversion, such as a polycrystalline silicon solar cell, a monocrystalline silicon solar cell, or a thin-film solar cell of CIGS or the like.

The storage battery 12 is a storage battery such as a lithium ion battery or a nickel-metal-hydride battery. The storage battery 12 may be discharged to supply power. The storage battery 12 is chargeable with not only power supplied from the grid or the solar cell 11 but also power supplied from the power generation device 33 as described later.

The power control device 20 converts DC power supplied from the solar cell 11 and the storage battery 12 and AC power supplied from the grid and the power generation device 33, and also controls the switching between grid-connected operation and isolated operation. The power control device 20 includes an inverter 21, grid-connected operation switches 22 and 23, an isolated operation switch 24, and a controller 25 that controls the overall power control device 20. The power control device 20 also includes an output unit 26 (see FIG. 2) for supplying AC power to the dummy output system 50 described later. The grid-connected operation switch 23 may be located outside the power control device 20.

The inverter 21 is a bidirectional inverter, and converts DC power supplied from the solar cell 11 and the storage battery 12 into AC power and AC power supplied from the grid and the power generation device 33 into DC power. A converter for stepping up the DC power from the solar cell 11 and the storage battery 12 to a predetermined voltage may be provided at a stage preceding the inverter 21.

The grid-connected operation switches 22 and 23 and the isolated operation switch 24 are each composed of a relay, a transistor, or the like, and controlled to be on or off. The isolated operation switch 24 is located between the power generation device 33 and the storage battery 12, as illustrated in the drawing. The grid-connected operation switches 22 and 23 and the isolated operation switch 24 are switched synchronously so that the grid-connected operation switches 22 and 23 and the isolated operation switch 24 are not on (or off) simultaneously. In more detail, when the grid-connected operation switches 22 and 23 are on, the isolated operation switch 24 is off synchronously. When the grid-connected operation switches 22 and 23 are off, the isolated operation switch 24 is on synchronously. The synchronous control of the grid-connected operation switches 22 and 23 and the isolated operation switch 24 is realized in terms of hardware by making the control signal wiring to the grid-connected operation switches 22 and 23 branch to the isolated operation switch 24. Here, the on/off state in response to the same control signal may be set independently for each switch. The synchronous control of the grid-connected operation switches 22 and 23 and the isolated operation switch 24 may be realized in terms of software by the controller 25.

The controller 25 is composed of a microcomputer as an example, and controls the operation of each of the inverter 21, grid-connected operation switches 22 and 23, isolated operation switch 24, etc. based on the state of a grid voltage increase, a power failure, and the like. During grid-connected operation, the controller 25 turns the grid-connected operation switches 22 and 23 on and the isolated operation switch 24 off. During isolated operation, the controller 25 turns the grid-connected operation switches 22 and 23 off and the isolated operation switch 24 on.

The distribution board 31 separates the power supplied from the grid during grid-connected operation into a plurality of branches and distributes the power to the load 32. The distribution board 31 also separates the power supplied from the plurality of distributed power sources (the solar cell 11, the storage battery 12, the power generation device 33) into a plurality of branches and distributes the power to the load 32. The load 32 is an electric power load that consumes power. Examples of the load 32 include various electric products for home use such as an air conditioner, a microwave, and a television, and machines, lighting systems, etc. for use in industrial and commercial installations such as an air conditioner and a lighting fixture.

The power generation device 33 includes a fuel cell or a gas power generator. The fuel cell includes a cell that generates DC power using hydrogen through a chemical reaction with oxygen in the air, an inverter that converts the generated DC power into AC power of 100 V or 200 V, and other auxiliaries. The fuel cell as the power generation device 33 is a system configured to supply AC power to the load 32 without involving the power control device 20, and is not necessarily designed based on the assumption that it is connected to the power control device 20. The fuel cell may thus be a versatile system. The gas power generator generates power by a gas engine that uses a predetermined gas or the like as fuel.

The power generation device 33 generates power while the corresponding current sensor 40 detects forward power flow (current in the power purchase direction). When generating power, the power generation device 33 performs load following operation of following the power consumption of the load 32 or rated operation at predetermined rated power. For example, the range of following in load following operation is 200 W to 700 W, and the rated power in rated operation is 700 W. The power generation device 33 may perform load following operation of following the power consumption of the load 32 during grid-connected operation, and perform load following operation or rated operation at rated power during isolated operation.

The current sensor 40 detects the current flowing between the grid and the power generation device 33. In Japan, the power generated by the power generation device 33 is unsellable. Accordingly, in the case where the current sensor 40 detects reverse power flow (current in the power selling direction) to the grid, the power generation device 33 stops generating power. While the current sensor 40 detects forward power flow, the power generation device 33 generates power in load following operation or rated operation on the ground that the power generation device 33 can supply power to the load 32. To reduce power consumption, the current sensor 40 is preferably placed in a position where the current by the power generation of the power generation device 33 does not flow during isolated operation in the power control device 20, as described later.

The power control system 100 in this embodiment performs such control that causes a dummy current in the same direction as forward power flow to flow to the current sensor 40 through the dummy output system 50, in the state where the power generation device 33 and the storage battery 12 are paralleled off from the grid. This causes the power generation device 33 to perform rated operation, so that the power generated by the power generation device 33 can be stored in the storage battery 12. The power storage using the dummy current through the dummy output system 50 is described in detail below.

Figure 2:
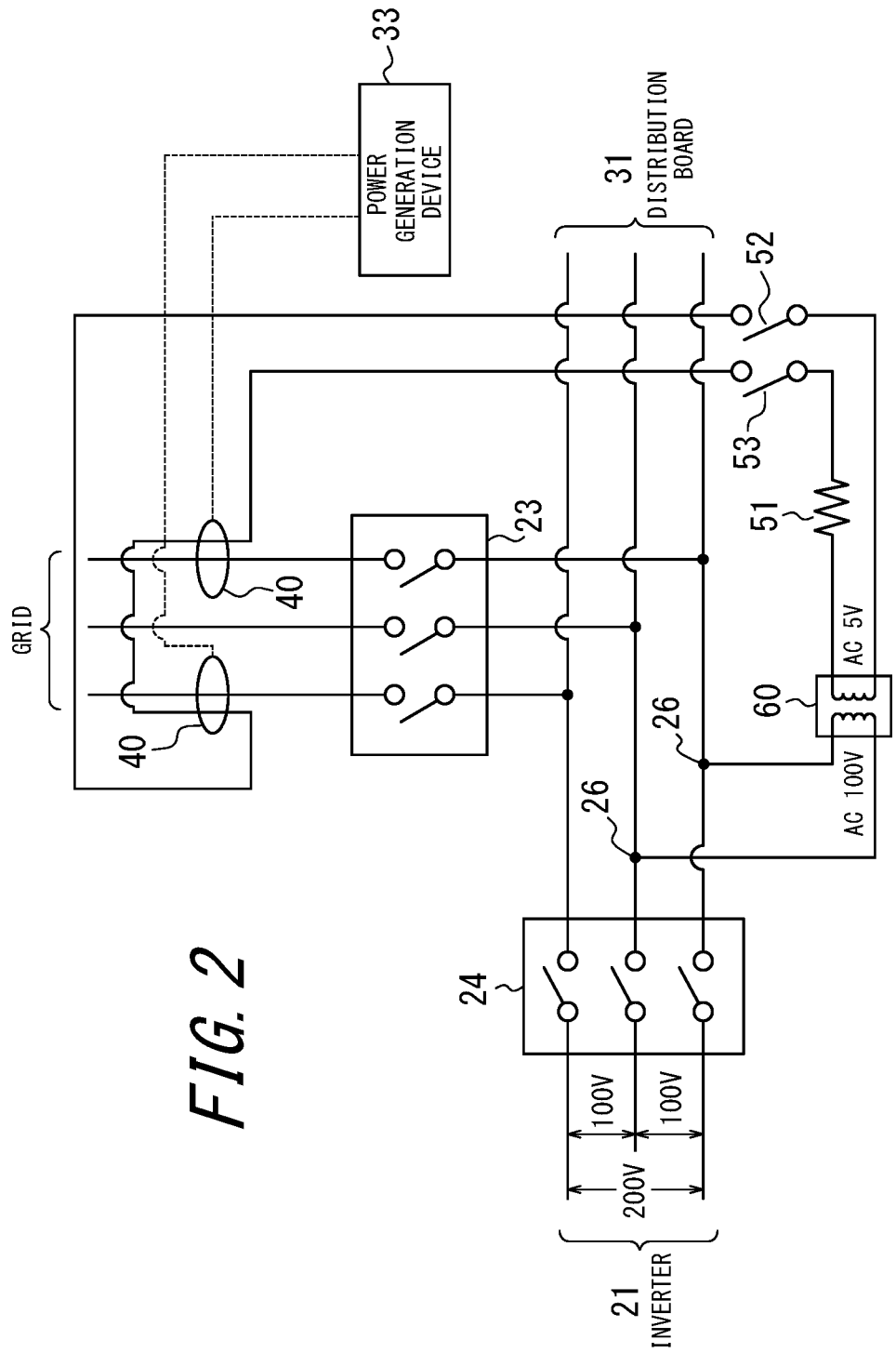
FIG. 2 is a diagram illustrating wiring relating to a dummy output system according to Embodiment 1.

The dummy output system 50 is configured to supply the dummy current, which is a current in the same direction as forward power flow, to the current sensor 40. The dummy output system 50 is supplied with power from the output unit 26 in the power control device 20 or the power generation device 33, and includes the dummy current load 51, a synchronous switch 52, a dummy current control switch 53, and a transformer 60. FIG. 2 is a diagram illustrating the wiring relating to the dummy output system 50. In FIG. 2, the grid is in the single-phase three-wire form of 200 V. In this case, one voltage line and a neutral line are connected to the dummy output system 50 at the output unit 26 via the transformer 60. The connection line to the dummy output system 50 is arranged to pass through the current sensor 40 placed in each of the two voltage lines, as illustrated in the drawing. The dummy output system 50 may be integral with the power control device 20, or independent of the power control device 20.

The dummy current load 51 is a load provided as appropriate for current adjustment in the dummy output system 50. The dummy current load 51 may be a load outside the dummy output system 50. The synchronous switch 52 is used to supply, to the current sensor 40, part of the power supplied from the power control device 20 or the power generation device 33 to the dummy output system 50, as the dummy current in the same direction as forward power flow. The dummy current control switch 53 prevents unnecessary power generation caused by the dummy current. The synchronous switch 52 and the dummy current control switch 53 are each composed of an independent relay, transistor, or the like, and independently controlled to be on or off by the controller 25 in the power control device 20.

The transformer 60 has a function of stepping down the power from the power control device 20 or the power generation device 33. In this embodiment, the transformer 60 has a turn ratio of 20, and steps down the AC power of 100 V from the power control device 20 or the power generation device 33 to AC power of 5 V and supplies the power to the dummy current load 51. By supplying the power stepped down by the transformer 60 to the dummy current load 51 in this way, the power consumption in the dummy current load 51 is reduced and the voltages for the switches 52 and 53 are reduced. This allows less expensive products to be used for the dummy current load 51 and the switches 52 and 53.

The synchronous switch 52 is controlled to be on or off synchronously with the isolated operation switch 24 in the power control device 20. In other words, the synchronous switch 52 is off during grid-connected operation and on during isolated operation, as with the isolated operation switch 24. In more detail, the synchronous switch 52 is a switch whose switching is synchronous with the switching between paralleling off from the grid and paralleling to the grid, and causes the dummy current to flow during paralleling off from the grid and causes the dummy current not to flow during paralleling to the grid. The synchronous control of the isolated operation switch 24 and the synchronous switch 52 is realized in terms of hardware by making the control signal wiring to the isolated operation switch 24 branch to the synchronous switch 52. The synchronous control of the isolated operation switch 24 and the synchronous switch 52 may be realized in terms of software by the controller 25.

The dummy current control switch 53 is off in the case where the charging of the storage battery 12 has been completed, and on in the case where the charging has not been completed. The case where the charging of the storage battery 12 has been completed indicates the case where the storage battery 12 is charged with a predetermined amount of power or more. The controller 25 may be configured to determine whether or not the charging has been completed, by communicating with the storage battery 12. When the charging of the storage battery 12 is completed and the dummy current control switch 53 is turned off during isolated operation, the dummy current stops flowing to the current sensor 40. This prevents unnecessary power generation by the power generation device 33.

The following describes an example of control in the power control system according to this embodiment in detail, with reference to drawings.

Figure 3:
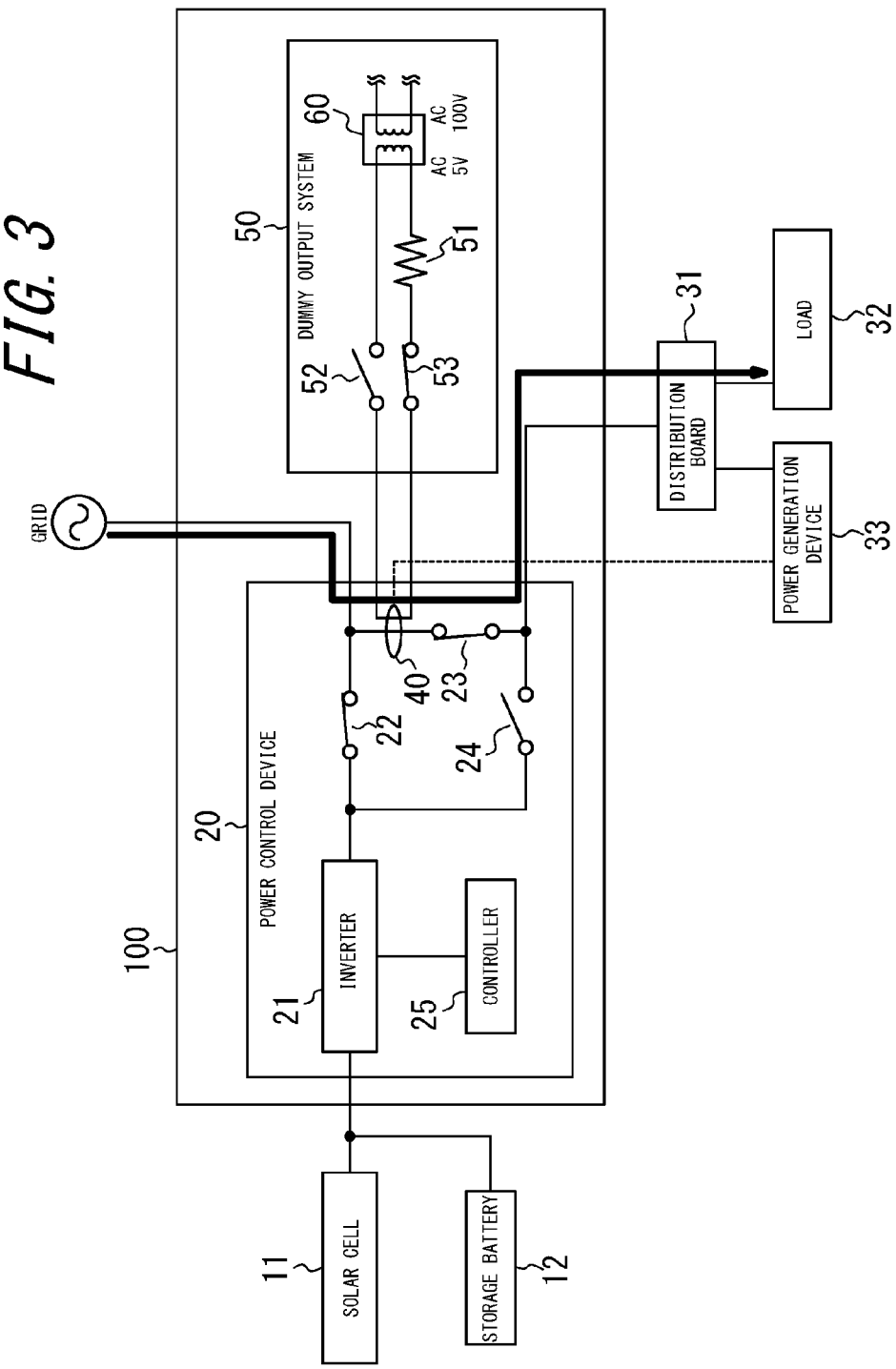
FIG. 3 is a diagram illustrating an example of control in the power control system according to Embodiment 1 during grid-connected operation.

FIG. 3 is a diagram illustrating an example of control in the power control system 100 during grid-connected operation. In this case, the switches in the power control device 20 are controlled as follows: The grid-connected operation switches 22 and 23 are on, and the isolated operation switch 24 is off. Moreover, the switches in the dummy output system 50 are controlled as follows: The synchronous switch 52 is off, and the dummy current control switch 53 is on or off according to the amount of charge in the storage battery 12.

During grid-connected operation, AC power of 100 V (or 200 V) is supplied from the grid to the load 32, as indicated by the thick arrow in FIG. 3. In the case where the charging of the storage battery 12 has not been completed, the power control device 20 converts the AC power from the grid into DC power, and charges the storage battery 12 with the DC power. The power control device 20 may also convert the power generated by the solar cell 11 into AC power and cause the power to reversely flow to the grid, or sell surplus power. Although the power control device 20 has a structure capable of outputting the power from the grid and the power from each distributed power source (the solar cell 11, the storage battery 12) to the dummy output system 50, the synchronous switch 52 is off during grid-connected operation, and therefore the dummy current is not supplied to the current sensor 40. The current sensor 40 detects forward power flow (current in the power purchase direction) from the grid, so that the power generation device 33 generates power and supplies the power to the load 32 via the distribution board 31.

Figure 4:
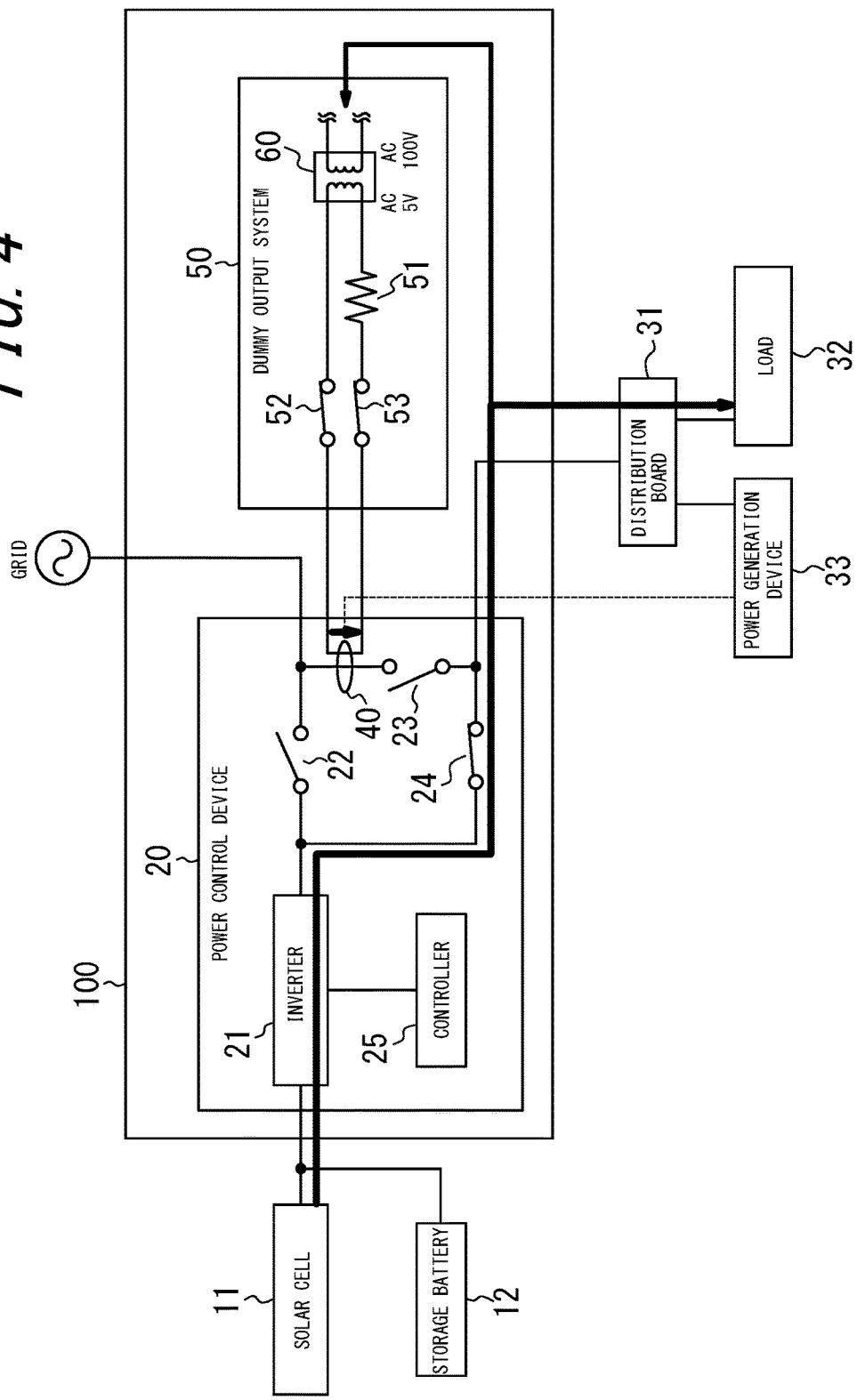
FIG. 4 is a diagram illustrating an example of control in the power control system according to Embodiment 1 during isolated operation (power generation by a solar cell)
Figure 5:
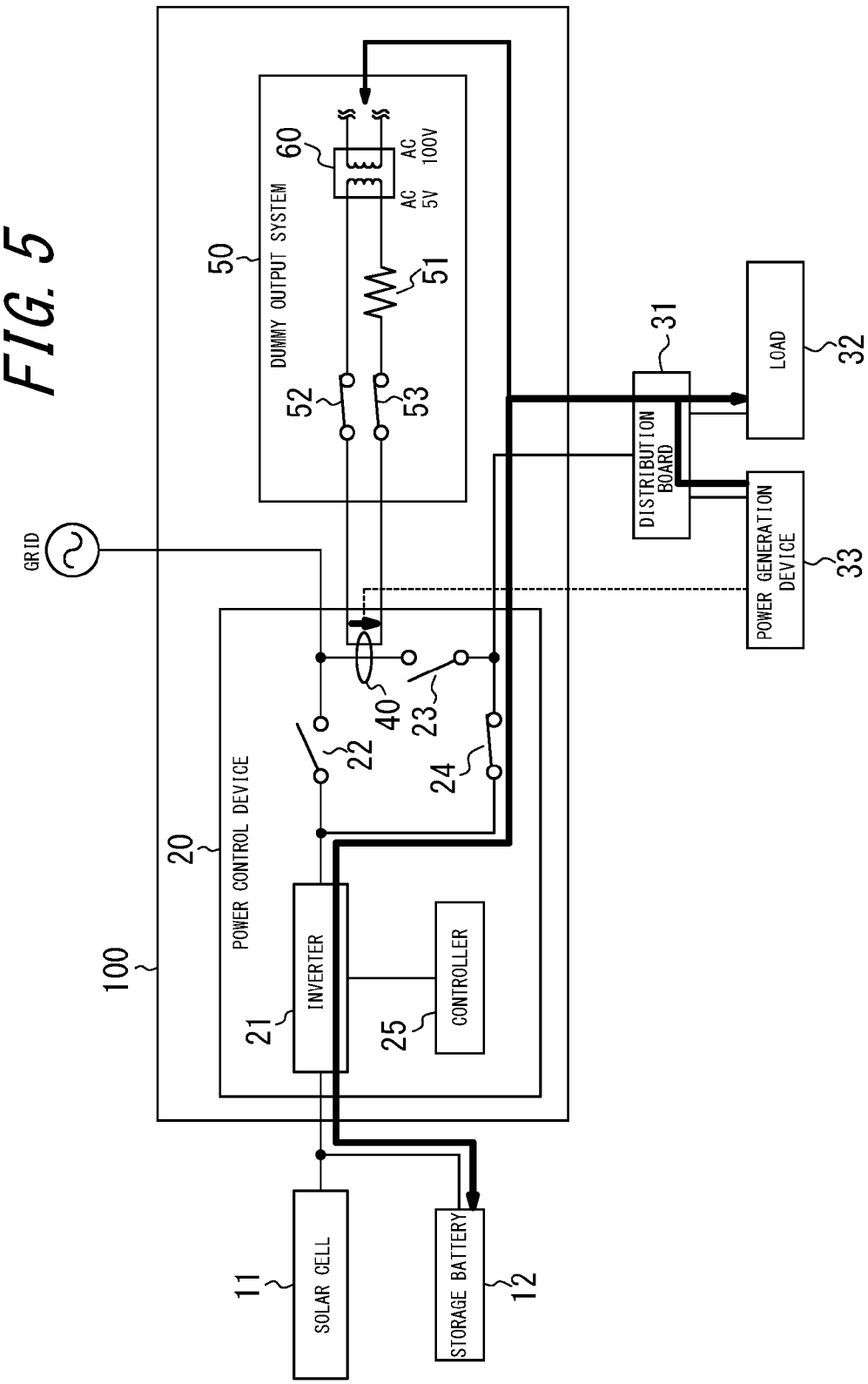
FIG. 5 is a diagram illustrating an example of control in the power control system according to Embodiment 1 during isolated operation (power generation by a power generation device)

An example of control in the power control system 100 during isolated operation is described below, with reference to FIGS. 4 and 5. In FIGS. 4 and 5, the charging of the storage battery 12 has not been completed. In this case, the switches in the power control device 20 are controlled as follows: The grid-connected operation switches 22 and 23 are off, and the isolated operation switch 24 is on. Moreover, the switches in the dummy output system 50 are controlled as follows: The synchronous switch 52 is on, and the dummy current control switch 53 is on.

FIG. 4 is a diagram illustrating power supply by each distributed power source during isolated operation. During isolated operation, the power control device 20 outputs the power of each distributed power source (the solar cell 11, the storage battery 12) to the load 32 and the dummy output system 50 via the isolated operation switch 24. In FIG. 4, as a result of the power control device 20 supplying the power to the dummy output system 50, the current sensor 40 detects forward power flow (current in the power purchase direction). The power generation device 33 in this embodiment is configured to start generating power only in the case where the current sensor 40 detects forward power flow not less than a predetermined threshold, in order to prevent the generated power from reversely flowing to the grid. FIG. 4 illustrates the state where the current sensor 40 detects only forward power flow less than the predetermined threshold, and only the solar cell 11 supplies power to the load 32.

FIG. 5 is a diagram illustrating the power generation of the power generation device 33 according to the dummy current during isolated operation. In the case where the power generation device 33 generates power during isolated operation, the power generation device 33 supplies power to the dummy output system 50, as illustrated in FIG. 5. The power supplied to the dummy output system 50 passes through the transformer 60, and is supplied to the current sensor 40 as the dummy current. When the current sensor 40 detects forward power flow (current in the power purchase direction) not less than the predetermined threshold, the power generation device 33 generates power in load following operation or rated operation. The distribution board 31 supplies the power generated by the power generation device 33 to the load 32, and supplies any surplus power over the power consumption of the load 32 to the power control device 20. The surplus power passes through the isolated operation switch 24 and is converted into DC power by the inverter 21 in the power control device 20, and is fed to the storage battery 12.

Thus, according to this embodiment, the power control system 100 includes the dummy output system 50 configured to supply power from the power generation device 33 or any other distributed power sources (the solar cell 11, the storage battery 12) in the state where the power generation device 33 and the other distributed power sources are paralleled off from the grid, and can supply the dummy current which is a current in the same direction as forward power flow to the current sensor 40 using the output from the dummy output system 50. This enables efficient operation control between a plurality of distributed power sources without undermining the versatility of the distributed power sources. In more detail, the flow of the dummy current to the current sensor 40 can cause the power generation device 33 to generate power during isolated operation. Since the power generation of the power generation device 33 is controlled using the dummy current to the current sensor 40, there is no need to specially change the power generation device 33 itself. This has the advantage that a general-purpose fuel cell system and gas power generation system can be utilized.

According to this embodiment, the power is supplied from the power control device 20 or the power generation device 33 to the dummy current load 51 in the dummy output system 50 via the transformer 60. With such a structure, the power consumption in the dummy current load 51 in the case of supplying the same dummy current to the current sensor 40 is reduced, and also the voltages for the switches 52 and 53 are reduced. This allows less expensive products to be used for the dummy current load 51 and the switches 52 and 53.

According to this embodiment, the synchronous switch 52 is a switch whose switching is synchronous with the switching between paralleling off from the grid and paralleling to the grid, and causes the dummy current to flow during paralleling off from the grid and causes the dummy current not to flow during paralleling to the grid. Hence, the dummy current flows to the current sensor 40 during isolated operation where the power generation device 33 and the other distributed power sources are paralleled off from the grid. On the other hand, the dummy current does not flow to the current sensor 40 during grid-connected operation where the power generation device 33 and the other distributed power sources are paralleled to the grid, thus suppressing erroneous reverse power flow from the power generation device 33.

According to this embodiment, the isolated operation switch 24 is off during grid-connected operation and on during isolated operation by the distributed power sources, and is located between the power generation device 33 and the other distributed power sources (the solar cell 11, the storage battery 12). Hence, the power generated by the power generation device 33 can be supplied to the other distributed power sources via the isolated operation switch 24 during isolated operation.

The storage battery 12 is chargeable with the power from the power generation device 33 when the isolated operation switch 24 is on. Accordingly, for example, surplus power generated by the power generation device 33 over the power consumption of the load 32 may be stored in the storage battery 12 during isolated operation.

Figure 6:
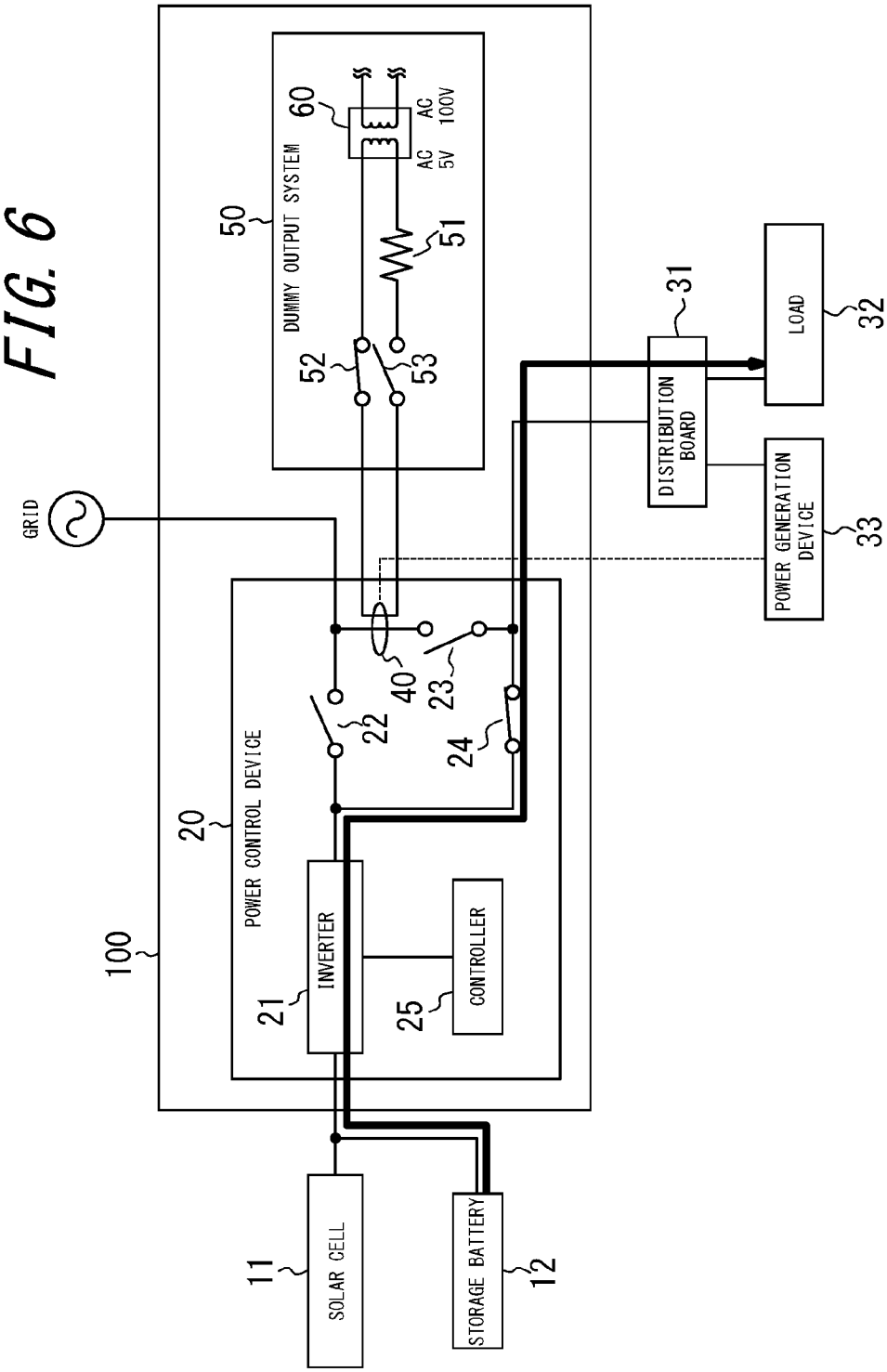
FIG. 6 is a diagram illustrating an example of control in the power control system according to Embodiment 1 during isolated operation (after the completion of charging of a storage battery)

FIG. 6 is a diagram illustrating an example of control in the power control system 100 during isolated operation after the completion of the charging of the storage battery 12. In this case, the switches in the power control device 20 are controlled as follows: The grid-connected operation switches 22 and 23 are off, and the isolated operation switch 24 is on. Moreover, the switches in the dummy output system are controlled as follows: The synchronous switch 52 is on, and the dummy current control switch 53 is off.

In the case where the charging of the storage battery 12 has been completed, the dummy current control switch 53 is off. Hence, part of the power supplied from the power control device 20 or the power generation device 33 to the dummy output system 50 is not supplied to the current sensor 40 as the dummy current in isolated operation. The current sensor 40 therefore detects neither the forward power flow from the grid nor the dummy current, and so the power generation device 33 stops generating power. This prevents excessive current output to the storage battery 12.

Once the charging of the storage battery 12 has been completed, the storage battery 12 starts discharging, as illustrated in FIG. 6. The power from the storage battery 12 is supplied to the load 32 via the inverter 21, the isolated operation switch 24, and the like. When the discharge is continued for a predetermined time and the amount of charge in the storage battery 12 falls below a threshold, the power control device 20 turns on the dummy current control switch 53 again. As a result of this control, the dummy current flows to the current sensor 40 again, and the power generation device 33 starts generating power to charge the storage battery 12 again.

Thus, according to this embodiment, the dummy current control switch 53 stops the dummy current when the charging of the storage battery 12 is completed, with it being possible to prevent excessive power generation by the power generation device 33.

The current sensor 40 is preferably placed in a position where the current by the power generation of the power generation device 33 does not flow during isolated operation in the power control device 20, as illustrated in FIGS. 1 to 6. If the current sensor 40 is placed in a position where the current by the power generation of the power generation device 33 flows, the dummy current for causing the power generation device 33 to generate power needs to exceed the current by the power generation, which leads to an increase in power consumption relating to the dummy current. By placing the current sensor 40 in a position where the current by the power generation of the power generation device 33 does not flow during isolated operation in the power control device 20, the power consumption relating to the dummy current can be reduced.

Embodiment 2

A power control system according to Embodiment 2 is described next, mainly focusing on the differences from Embodiment 1.

Figure 7:
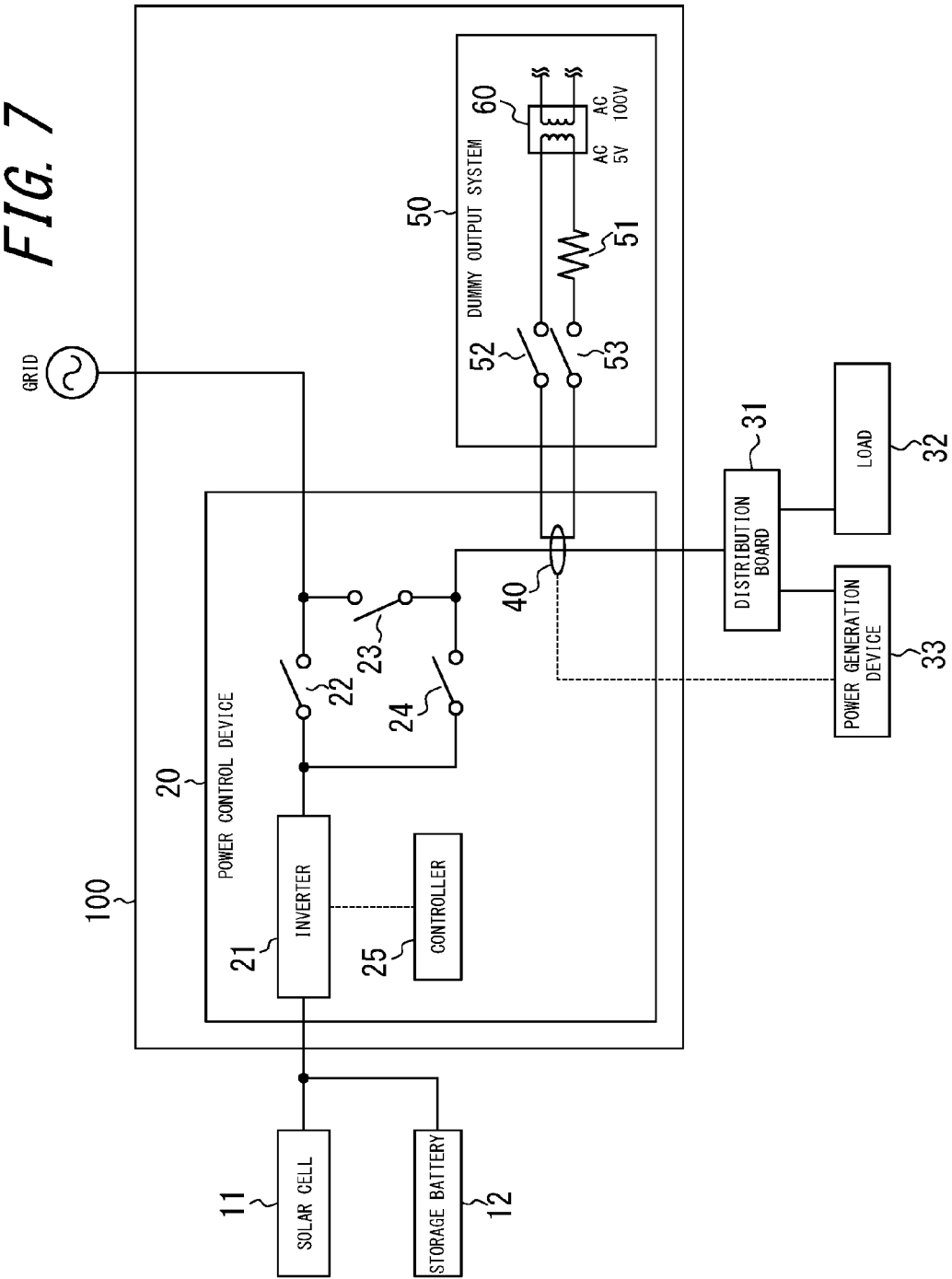
FIG. 7 is a block diagram of a power control system according to Embodiment 2.

In FIG. 7, the current sensor 40 is located between the isolated operation switch 24 and the distribution board 31, to be capable of detecting the current flowing between the grid and the power generation device 33 and the current flowing between the power generation device 33 and the storage battery 12.

Figure 8:
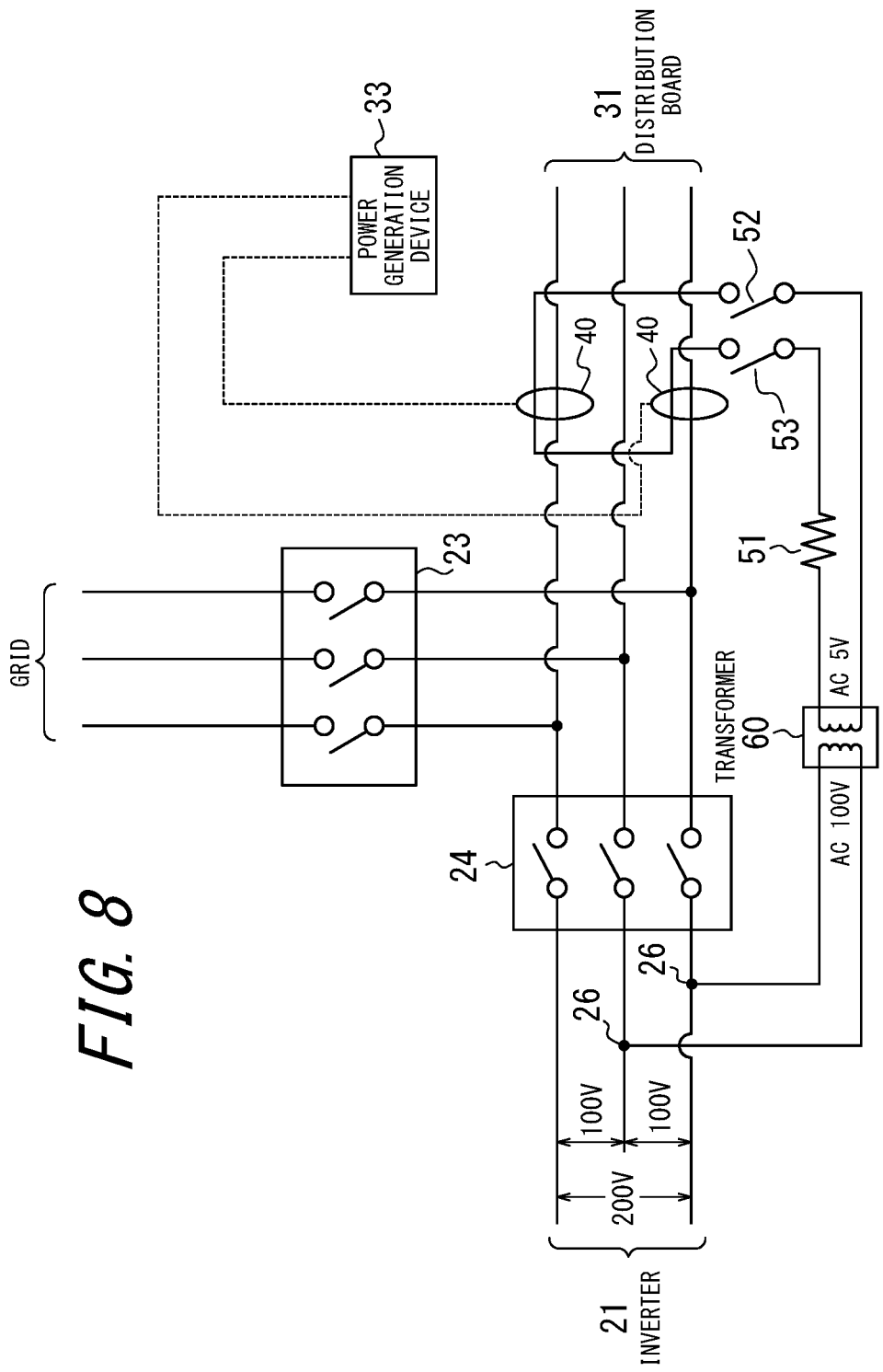
FIG. 8 is a diagram illustrating wiring relating to a dummy output system according to Embodiment 2.

As illustrated in FIGS. 7 and 8, the dummy current load 51 and the dummy current control switch 53 are connected in series. When the synchronous switch 52 and the dummy current control switch 53 are both on, the dummy current flows through the dummy current load 51.

Figure 9:
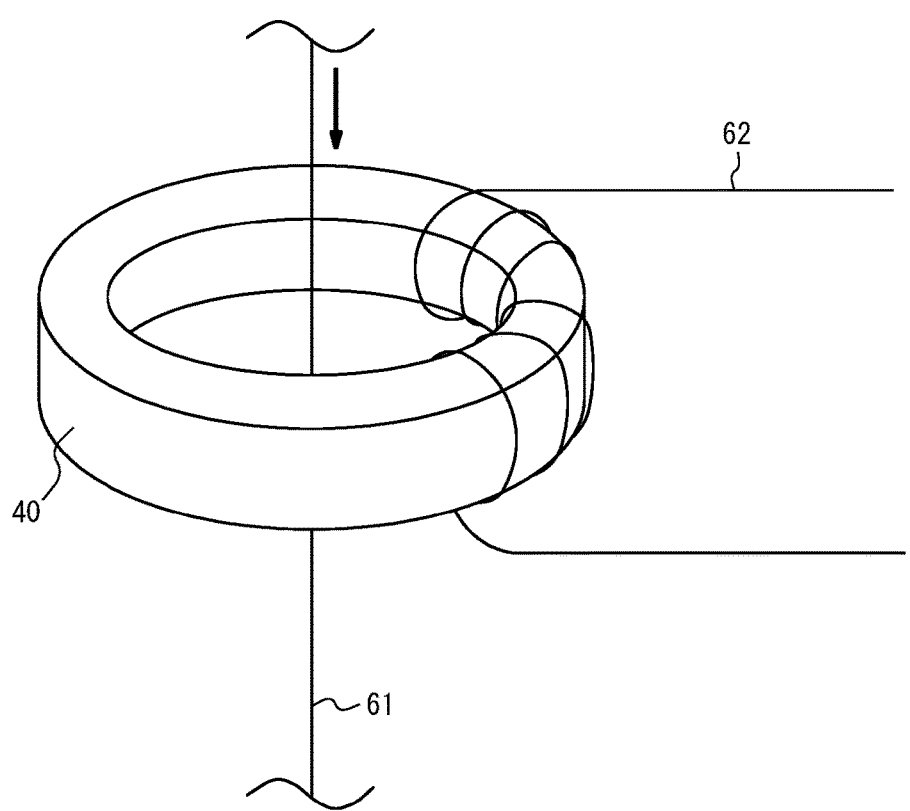
FIG. 9 is a diagram illustrating wiring between a current sensor and each of a power line and the dummy output system in the power control system according to Embodiment 2.

FIG. 9 is a diagram illustrating the connection between the current sensor 40 and each of a power line 61 and a dummy output line 62. The power line 61 from the grid and each distributed power source passes through the center of the ring-shaped current sensor 40, and the dummy output line 62 from the dummy output system is wound around the current sensor 40 a predetermined number of turns. More winding of the dummy output line 62 around the current sensor 40 enables the detection of larger current in the forward power flow direction using small dummy current.

The transformer 60 has a function of stepping down the power from the power control device 20 or the power generation device 33. In this embodiment, the transformer 60 has a turn ratio of 20, and steps down the AC power of 100 V from the power control device 20 or the power generation device 33 to AC power of 5 V and supplies the power to the dummy current load 51. By supplying the power stepped down by the transformer 60 to the dummy current load 51 in this way, the power consumption in the dummy current load 51 is reduced, which allows the dummy current load 51 to be downsized. In addition, the voltages for the switches 52 and 53 are reduced, which allows less expensive products to be used for the switches 52 and 53. Moreover, larger dummy current can be caused to flow with the same power consumption in the dummy current load 51.

The synchronous switch 52 is controlled to be on or off synchronously with the isolated operation switch 24 in the power control device 20. In other words, the synchronous switch 52 is off during grid-connected operation and on during isolated operation, as with the isolated operation switch 24. In more detail, the synchronous switch 52 is a switch whose switching is synchronous with the switching between paralleling off from the grid and paralleling to the grid, and causes the dummy current to flow during paralleling off from the grid and causes the dummy current not to flow during paralleling to the grid. The synchronous control of the isolated operation switch 24 and the synchronous switch 52 is realized in terms of hardware by making the control signal wiring to the isolated operation switch 24 branch to the synchronous switch 52. The synchronous control of the isolated operation switch 24 and the synchronous switch 52 may be realized in terms of software by the controller 25.

The dummy current control switch 53 is off in the case where the charging of the storage battery 12 has been completed, and on in the case where the charging has not been completed. The case where the charging of the storage battery 12 has been completed indicates the case where the storage battery 12 is charged with a predetermined amount of power or more. The controller 25 may be configured to determine whether or not the charging has been completed, by communicating with the storage battery 12. When the charging of the storage battery 12 is completed and the dummy current control switch 53 is turned off during isolated operation, the dummy current stops flowing to the current sensor 40. This prevents unnecessary power generation by the power generation device 33.

The following describes the setting of the dummy current value in this embodiment. The power generation device 33 in the power control system according to this embodiment has rated power of 700 W. In FIGS. 7 and 8, if the power generation device 33 outputs power of 700 W, the current sensor 40 detects current in the reverse power flow direction equivalent to the output power of 700 W.

In view of this, in this embodiment, the power control device 20 or the power generation device 33 supplies power to the dummy output system 50, and the dummy output system 50 causes dummy current for canceling out the current in the reverse power flow direction detected by the current sensor 40 to flow. For example, when the detection error in the current sensor is 35 W in terms of output power, the dummy output system needs to generate at least dummy current equivalent to output power of 735 W, in order to ensure that the current sensor always detects forward power flow.

In this embodiment, suppose dummy current equivalent to output power of 800 W which is greater than 735 W is generated. When the output voltage of the distributed power sources is AC power of 200 V and the number of turns of the dummy output line 62 wound around the current sensor is 8, the dummy current $I_1$ to be generated by the dummy output system is calculated as follows:

$$I_1 = 800/200/8 = 0.5 [A] \quad \text{Equation (1).}$$

The method of determining the resistance $R_1$ of the dummy current load 51 for generating the dummy current $I_1$ is described below. As illustrated in FIG. 8, one voltage line and a neutral line are connected to the dummy output system 50, and the AC voltage of 100 V is stepped down to AC power of 5 V by the transformer 60 and then supplied to the dummy output system 50. The resistance $R_1$ for generating the dummy current $I_1$ is accordingly calculated as follows:

$$R_1 = 5/0.5 = 1.0 \times 10^1 [\Omega] \quad \text{Equation (2).}$$

The dummy current $I_1$ and the resistance $R_1$ calculated in the aforementioned manner are merely an example, and various parameters may be selected depending on the number of turns of the dummy output line 62, the dummy current (equivalent output power) to be supplied to the current sensor, etc.

The following describes an example of control in the power control system according to this embodiment in detail, with reference to drawings.

Figure 10:
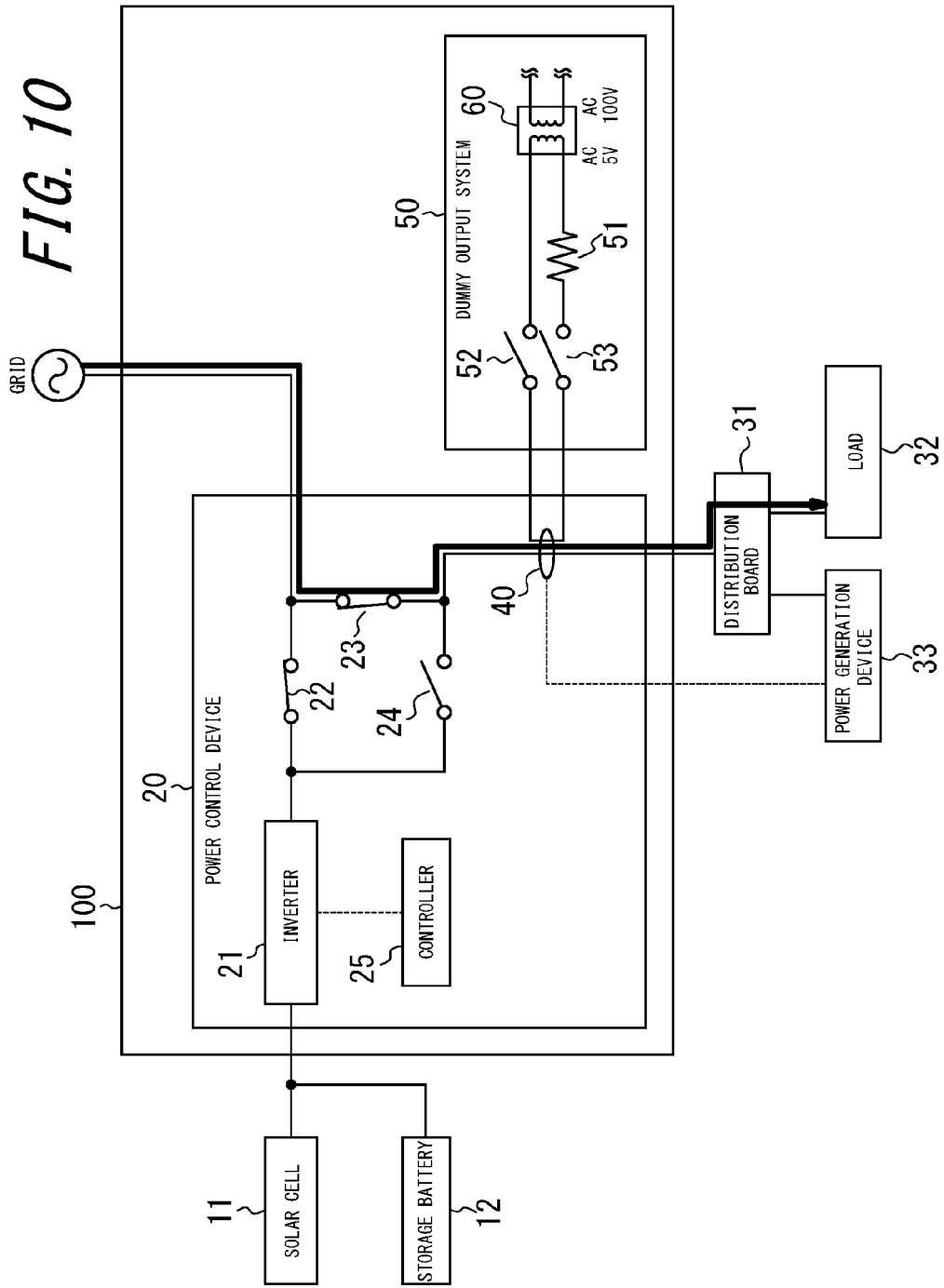
FIG. 10 is a diagram illustrating an example of control in the power control system according to Embodiment 2 during grid-connected operation.

FIG. 10 is a diagram illustrating an example of control in the power control system 100 during grid-connected operation. In this case, the switches in the power control device 20 are controlled as follows: The grid-connected operation switches 22 and 23 are on, and the isolated operation switch 24 is off. Moreover, the switches in the dummy output system 50 are controlled as follows: The synchronous switch 52 is off, and the dummy current control switch 53 is on or off according to the amount of charge in the storage battery 12.

During grid-connected operation, AC power of 100 V (or 200 V) is supplied from the grid to the load 32, as indicated by the thick arrow in FIG. 10. In the case where the charging of the storage battery 12 has not been completed, the power control device 20 converts AC power from the grid into DC power, and charges the storage battery 12 with the DC power. The power control device 20 may also convert the power generated by the solar cell 11 into AC power and cause the power to reversely flow to the grid, or sell surplus power. Although the power control device 20 has a structure configured to output the power from the grid and the power from each distributed power source (the solar cell 11, the storage battery 12) to the dummy output system 50, the synchronous switch 52 is off during grid-connected operation, and therefore the dummy current is not supplied to the current sensor 40. The current sensor 40 detects forward power flow (current in the power purchase direction) from the grid, so that the power generation device 33 generates power and supplies the power to the load 32 via the distribution board 31.

Figure 11:
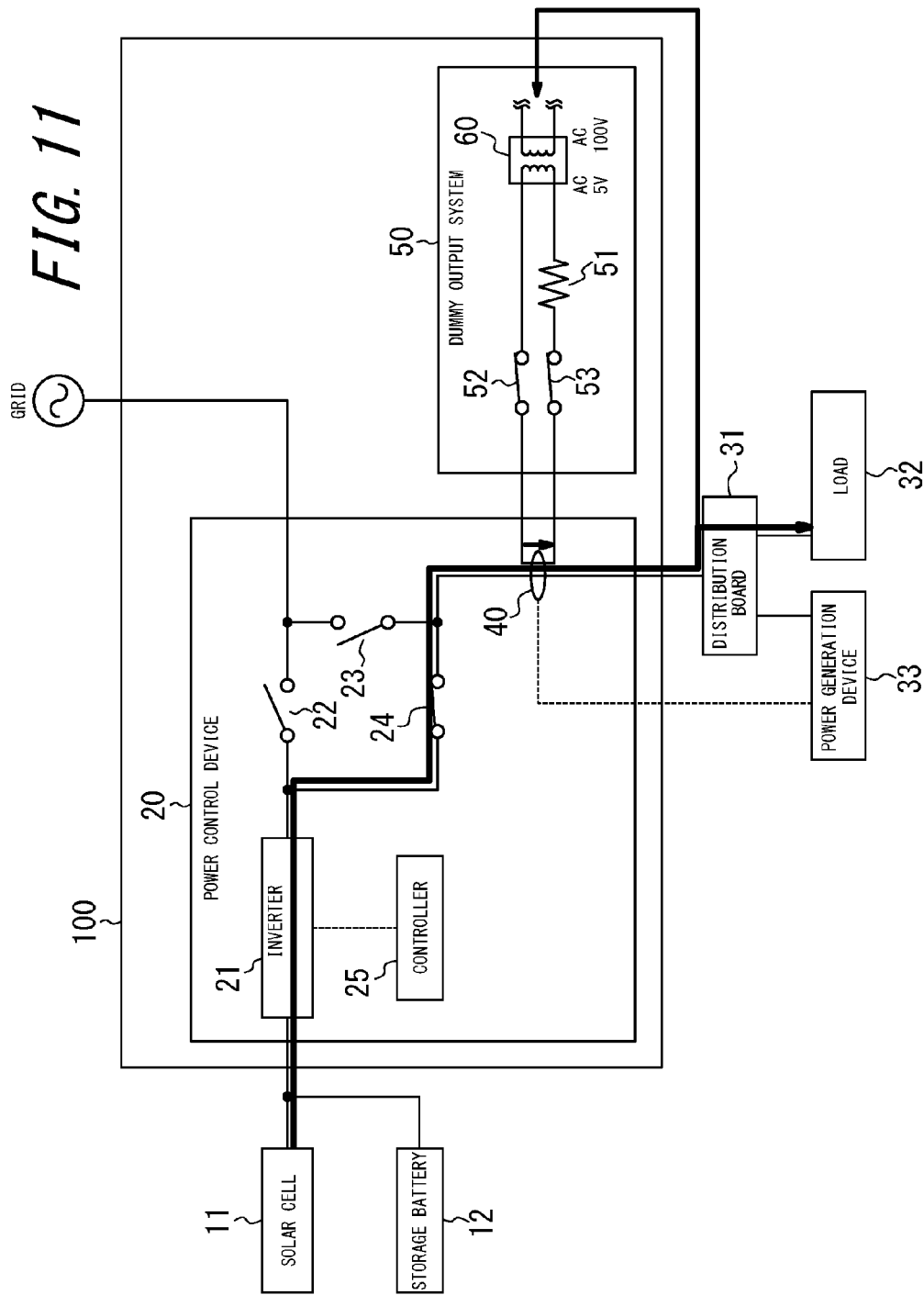
FIG. 11 is a diagram illustrating an example of control in the power control system according to Embodiment 2 during isolated operation (power generation by a solar cell)
Figure 12:
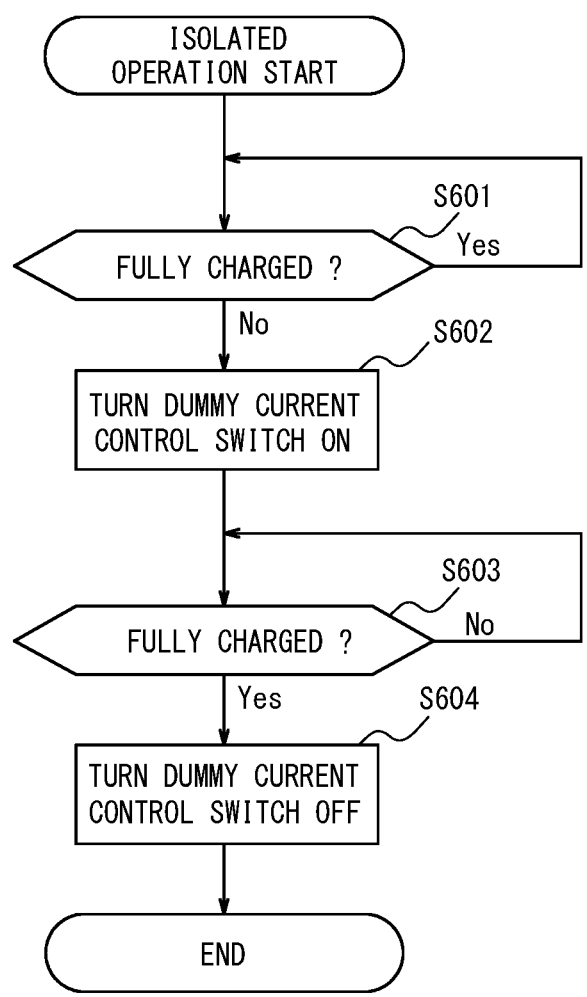
FIG. 12 is a flowchart of the operation of the power control system according to Embodiment 2 from when a power generation device starts charging a storage battery to when the power generation device ends the charging.

An example of control in the power control system 100 during isolated operation is described below, with reference to FIGS. 11 and 12. In FIGS. 11 and 12, the charging of the storage battery 12 has not been completed. In this case, the switches in the power control device 20 are controlled as follows: The grid-connected operation switches 22 and 23 are off, and the isolated operation switch 24 is on. Moreover, the switches in the dummy output system 50 are controlled as follows: The synchronous switch 52 is on, and the dummy current control switch 53 is on.

FIG. 11 is a diagram illustrating power supply by each distributed power source during isolated operation. During isolated operation, the power control device 20 outputs the power of each distributed power source (the solar cell 11, the storage battery 12) to the load 32 and the dummy output system 50 via the isolated operation switch 24. In FIG. 11, as a result of the power control device 20 supplying the power to the dummy output system 50, the current sensor 40 detects forward power flow (current in the power purchase direction). The power generation device 33 in this embodiment is configured to start generating power only in the case where the current sensor 40 detects forward power flow not less than a predetermined threshold, in order to prevent the generated power from reversely flowing to the grid. FIG. 11 illustrates the state where the current sensor 40 detects only forward power flow less than the predetermined threshold, and only the solar cell 11 supplies power to the load 32.

The following describes the case of charging the storage battery 12 from the power generation device 33. FIG. 12 is a flowchart of the operation of the power control system from when the power generation device starts charging the storage battery to when the power generation device ends the charging. The controller 25 determines whether or not the storage battery 12 is fully charged (step S601). In the case of determining that the storage battery 12 is not fully charged, the controller 25 turns the dummy current control switch 53 on (step S602). The power control system 100 accordingly shifts to the state where the storage battery 12 is chargeable from the power generation device 33 as illustrated in FIG. 13.

Figure 13:
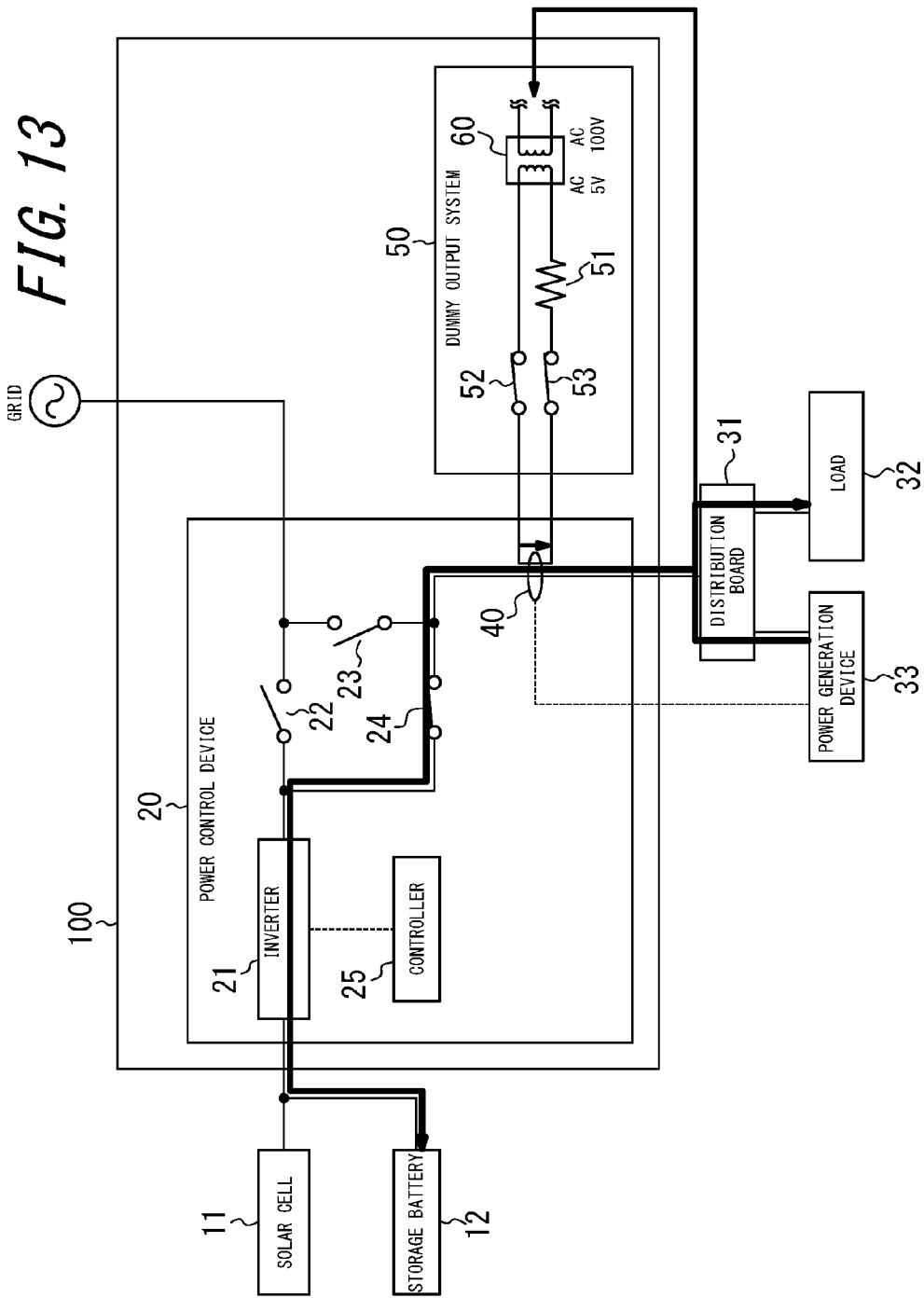
FIG. 13 is a diagram illustrating an example of control in the power control system according to Embodiment 2 during isolated operation (power generation by the power generation device)

FIG. 13 is a diagram illustrating the power generation of the power generation device 33 according to the dummy current during isolated operation. In the case where the power generation device 33 generates power during isolated operation, the power generation device 33 supplies power to the dummy output system 50, as illustrated in FIG. 13. The power supplied to the dummy output system 50 passes through the transformer 60, and is supplied to the current sensor 40 as the dummy current. The dummy output system 50 operates so that the current sensor 40 detects forward power flow (current in the power purchase direction) not less than the predetermined threshold, as a result of which the power generation device 33 generates power in load following operation or rated operation. The distribution board 31 supplies the power generated by the power generation device 33 to the load 32, and supplies any surplus power over the power consumption of the load 32 to the power control device 20. The surplus power passes through the isolated operation switch 24 and is converted into DC power by the inverter 21 in the power control device 20, and is fed to the storage battery 12.

Thus, according to this embodiment, the power control system 100 includes the dummy output system 50 configured to supply power from the power generation device 33 or any other distributed power sources (the solar cell 11, the storage battery 12) in the state where the power generation device 33 and the other distributed power sources are paralleled off from the grid, and can supply the dummy current which is a current in the same direction as forward power flow to the current sensor 40 using the output from the dummy output system 50. This enables efficient operation control between a plurality of distributed power sources without undermining the versatility of the distributed power sources. In more detail, the flow of the dummy current to the current sensor 40 can intentionally cause the power generation device 33 to perform rated power generation during isolated operation. Since the power generation of the power generation device 33 is controlled using the dummy current to the current sensor 40, there is no need to specially change the power generation device 33 itself. This has the advantage that a general-purpose fuel cell system and gas power generation system can be utilized.

According to this embodiment, the power is supplied from the power control device 20 or the power generation device 33 to the dummy current load 51 in the dummy output system 50 via the transformer 60. With such a structure, the power consumption in the dummy current load 51 in the case of supplying the same dummy current to the current sensor 40 is reduced, which allows the dummy current load 51 to be downsized. In addition, the voltages for the switches 52 and 53 are reduced, which allows less expensive products to be used for the switches 52 and 53. Moreover, larger dummy current can be caused to flow with the same power consumption in the dummy current load 51.

Therefore, even in the case where the power generation device 33 generates larger power, larger dummy current for canceling out the detection of current in the reverse power flow direction can be caused to flow.

According to this embodiment, the synchronous switch 52 is a switch whose switching is synchronous with the switching between paralleling off from the grid and paralleling to the grid, and causes the dummy current to flow during paralleling off from the grid and causes the dummy current not to flow during paralleling to the grid. Hence, the dummy current flows to the current sensor 40 during isolated operation where the power generation device 33 and the other distributed power sources are paralleled off from the grid. On the other hand, the dummy current does not flow to the current sensor 40 during grid-connected operation where the power generation device 33 and the other distributed power sources are paralleled to the grid, thus suppressing erroneous reverse power flow from the power generation device 33.

According to this embodiment, the isolated operation switch 24 is off during grid-connected operation and on during isolated operation by the distributed power sources, and is located between the power generation device 33 and the other distributed power sources (the solar cell 11, the storage battery 12). Hence, the power generated by the power generation device 33 can be supplied to the other distributed power source via the isolated operation switch 24 during isolated operation.

The storage battery 12 is chargeable with the power from the power generation device 33 when the isolated operation switch 24 is on. Accordingly, for example, surplus power generated by the power generation device 33 over the power consumption of the load 32 may be stored in the storage battery 12 during isolated operation.

In FIG. 12, in the case where the controller 25 determines that the storage battery 12 is fully charged (step S603), the controller 25 turns the dummy current control switch 53 off (step S604). The power control system 100 accordingly shifts to the state after the completion of the charging as illustrated in FIG. 14.

Figure 14:
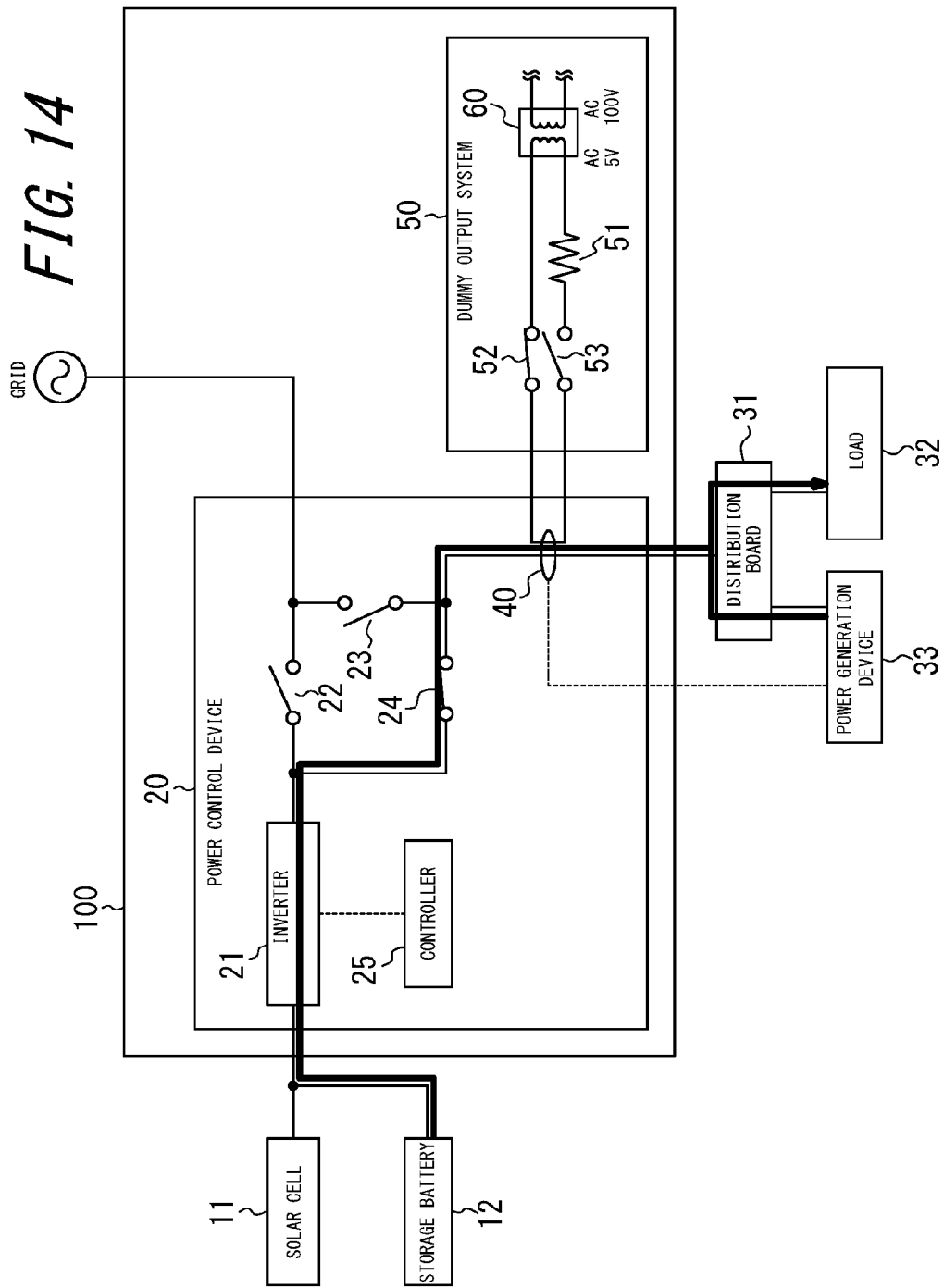
FIG. 14 is a diagram illustrating an example of control in the power control system according to Embodiment 2 during isolated operation (after the completion of charging of the storage battery).

FIG. 14 is a diagram illustrating an example of control in the power control system 100 during isolated operation after the completion of the charging of the storage battery 12. In this case, the switches in the power control device 20 are controlled as follows: The grid-connected operation switches 22 and 23 are off, and the isolated operation switch 24 is on. Moreover, the switches in the dummy output system 50 are controlled as follows: The synchronous switch 52 is on, and the dummy current control switch 53 is off.

In the case where the charging of the storage battery 12 has been completed, the dummy current control switch 53 is off. Hence, part of the power supplied from the power control device 20 or the power generation device 33 to the dummy output system 50 is not supplied to the current sensor 40 as the dummy current in isolated operation. Here, the current sensor 40 detects the current in the forward power flow direction supplied from the storage battery 12 to the load 32, and the power generation device 33 performs load following operation of supplying power to the load.

In FIG. 14, the power discharged from the storage battery 12 is supplied to the load 32 via the inverter 21, the isolated operation switch 24, and the like. When the discharge is continued for a predetermined time and the amount of charge in the storage battery 12 falls below a threshold, the power control device 20 turns on the dummy current control switch 53 again. As a result of this control, the dummy current flows to the current sensor 40 again, and the power generation device 33 is switched from load following operation to rated operation to charge the storage battery 12 again.

Thus, according to this embodiment, the dummy current control switch 53 stops the dummy current when the charging of the storage battery 12 is completed, with it being possible to prevent excessive power generation by the power generation device 33.

According to this embodiment, the current sensor 40 is located between the isolated operation switch 24 and the power generation device 33 as illustrated in FIG. 7, to also enable the detection of current in the direction from the power generation device 33 to the other distributed power sources in the isolated operation mode. With such a structure, the power generation device 33 can be caused to perform load following operation in the isolated operation mode. Moreover, in the case where the power generation device 33 is charging the storage battery 12, the controller 25 may check the detection of current in the current sensor 40 by increasing or decreasing the power generated from the power generation device 33.

Although the foregoing embodiments describe the case where the solar cell 11, the storage battery 12, and the power generation device 33 are not included in the power control system 100, these distributed power sources may be included in the power control system 100.

Although the foregoing embodiments describe the case where the synchronous switch 52 and the dummy current control switch 53 are each an independent switch that is switched according to a separate condition, these switches may be combined together. In detail, these switches may be configured as one switch that is on only during isolated operation and during charging. Although the foregoing embodiments describe an example where the synchronous switch 52 and the dummy current control switch 53 are located on the secondary side of the transformer, these switches may be located on the primary side of the transformer. In the case where the switches are located on the primary side, no current flows through the transformer and so losses in the transformer can be avoided.

Although the disclosed system and method have been described by way of the drawings and embodiments, various changes or modifications may be easily made by those of ordinary skill in the art based on the disclosure. Such various changes or modifications are therefore included in the scope of the disclosure. For example, the functions included in the members, means, steps, etc. may be rearranged without logical inconsistency, and a plurality of means, steps, etc. may be combined into one means, step, etc. and a means, step, etc. may be divided into a plurality of means, steps, etc.

Many of the disclosed aspects are described in terms of sequences of operations performed by a computer system or other hardware capable of executing program instructions. Examples of the computer system or other hardware include a general-purpose computer, a personal computer (PC), a dedicated computer, a workstation, a personal communications system (PCS), a RFID receiver, an electronic notepad, a laptop computer, a global positioning system (GPS) receiver, and other programmable data processors. Note that, in each embodiment, various operations are executed by dedicated circuitry (e.g. discrete logical gates interconnected to realize specific functions) implemented by program instructions (software) or logical blocks, program modules, or the like executed by at least one processor. Examples of the at least one processor executing logical blocks, program modules, or the like include at least one microprocessor, central processing unit (CPU), application specific integrated circuit (ASIC), digital signal processor (DSP), programmable logic device (PLD), field programmable gate array (FPGA), processor, controller, microcontroller, microprocessor, electronic device, other devices designed to execute the functions described herein, and/or any combination thereof. The embodiments described herein are implemented, for example, by hardware, software, firmware, middleware, microcode, or any combination thereof. Instructions may be program code or code segments for performing necessary tasks, and may be stored in a non-transitory machine-readable storage medium or other medium. A code segment may represent a procedure, a function, a subprogram, a program, a routine, a subroutine, a module, a software package, a class, or any combination of instructions, data structures, or program statements. A code segment is connected to another code segment or a hardware circuit, by performing transmission and/or reception of information, data arguments, variables, or storage contents with the other code segment or hardware circuit.

Examples of the network used herein include, unless otherwise specified, the Internet, an ad hoc network, a local area network (LAN), a cellular network, a wireless personal area network (WPAN), other networks, or any combination thereof. The components of the wireless network include, for example, an access point (e.g. Wi-Fi access point) and a femtocell. The wireless communicator may be connected to a wireless network using Wi-Fi, Bluetooth® (Bluetooth is a registered trademark in Japan, other countries, or both), cellular communication technology (e.g. Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA)), or any other wireless technology and/or technological standard.

The non-transitory machine-readable storage medium used herein may be in any tangible form of computer-readable carrier (medium) in the categories of solid-state memory, magnetic disk, and optical disk. Such a medium stores an appropriate set of computer instructions, such as program modules, and data structures for causing a processor to carry out the techniques disclosed herein. Examples of the computer-readable medium include an electrical connection having one or more wires, a magnetic disk storage medium, a magnetic cassette, magnetic tape, other magnetic and optical storage devices (e.g. compact disk (CD), LaserDisc® (LaserDisc is a registered trademark in Japan, other countries, or both), digital versatile disc (DVD® (DVD is a registered trademark in Japan, other countries, or both)), Floppy® (Floppy is a registered trademark in Japan, other countries, or both)) disk, Blu-ray Disc® (Blu-ray Disc is a registered trademark in Japan, other countries, or both)), a portable computer disk, random access memory (RAM), read-only memory (ROM), EPROM, EEPROM, flash memory, other rewritable and programmable ROM, other tangible storage medium capable of storage, and any combination thereof. Memory may be provided inside and/or outside a processor/processing unit. The term "memory" used herein indicates any type of memory such as long-term storage, short-term storage, volatile, nonvolatile, and other memory, and the number of memory media or the types of media are not limited.

It should be noted that the system is disclosed herein as having various modules and/or units for executing specific functions. These modules and units are schematically illustrated to simplify the description of its functionality, and do not necessarily represent specific hardware and/or software. In this regard, the modules, units, and other components may be hardware and/or software implemented to substantially execute the specific functions described herein. Various functions of different components may be any combination or separate ones of hardware and/or software, and may be used separately or in combination. Input/output (I/O) devices or user interfaces including, but not limited to, a keyboard, a display, a touchscreen, and a pointing device may be connected to the system directly or via intervening I/O controllers. Thus, the disclosed various aspects may be embodied in many different forms, and all such embodiments are within the scope of the disclosure.

REFERENCE SIGNS LIST 11 solar cell
12 storage battery
20 power control device
21 inverter
22, 23 grid-connected operation switch
24 isolated operation switch
25 controller
26 output unit
31 distribution board
32 load
33 power generation device
40 current sensor
50 dummy output system
51 dummy current load
52 synchronous switch
53 dummy current control switch
60 transformer
61 power line
62 dummy output line
100 power control system

The invention claimed is:

1. A power control system that controls a power generation device and other distributed power sources, the power generation device including at least one of a fuel cell and a gas power generator, and generating power when a current sensor detects forward power flow, the power control system comprising:
a power control device including an output terminal coupled with the other distributed power sources to output power supplied from the other distributed power sources, in a state where the power generation device and the other distributed power sources are paralleled off from a grid; and
a dummy output system configured to supply a dummy current detectable by the current sensor as a current in the same direction as the forward power flow, using an output from the output terminal,
wherein the dummy output system includes a step-down transformer configured to step down the power supplied from the output terminal, and a dummy current load configured to transform a voltage, reduced by the step-down transformer, into the dummy current.

2. The power control system according to claim 1, wherein the dummy output system is also configured to supply the dummy current using an output from the power generation device, and the step-down transformer is also located between the power generation device and the current sensor.

3. The power control system according to claim 2, wherein the dummy output system further includes switching elements for selecting whether or not to cause the dummy current to flow.

4. The power control system according to claim 2, wherein the power generation device includes a fuel cell.

5. The power control system according to claim 2, wherein the power generation device starts generating power when the current sensor detects the current not less than a predetermined threshold in the same direction as the forward power flow.

6. The power control system according to claim 1, wherein the current sensor is placed in a position where a current flowing between the grid and the power generation device and a current flowing between the power generation device and the other distributed power sources are detectable.

7. The power control system according to claim 6, wherein the dummy output system further includes switching elements for selecting whether or not to cause the dummy current to flow.

8. The power control system according to claim 6, wherein the power generation device includes a fuel cell.

9. The power control system according to claim 6, wherein the power generation device starts generating power when the current sensor detects the current not less than a predetermined threshold in the same direction as the forward power flow.

10. The power control system according to claim 1, wherein the dummy output system further includes switching elements configured to select whether or not to cause the dummy current to flow.

11. The power control system according to claim 10, wherein the power generation device includes a fuel cell.

12. The power control system according to claim 10, wherein the power generation device starts generating power when the current sensor detects the current not less than a predetermined threshold in the same direction as the forward power flow.

13. The power control system according to claim 1, wherein the power generation device includes a fuel cell.

14. The power control system according to claim 13, wherein the power generation device starts generating power when the current sensor detects the current not less than a predetermined threshold in the same direction as the forward power flow.

15. The power control system according to claim 1, wherein the power generation device starts generating power when the current sensor detects the current not less than a predetermined threshold in the same direction as the forward power flow.

16. A control method of a power control system that is provided in a consumer's facility and performs power control, the consumer's facility including a power generation device and other distributed power sources, the power generation device including at least one of a fuel cell and a gas power generator, and generating power when a current sensor detects forward power flow, the control method including:
outputting power supplied from the other distributed power sources, in a state where the power generation device and the other distributed power sources are paralleled off from a grid;
stepping down the power supplied from the other distributed power sources; and
supplying a dummy current detectable by the current sensor as a current in the same direction as the forward power flow, using the stepped down power.

* * * * *